A. C. GRANT.
AUTOMOBILE WHEEL.
APPLICATION FILED MAY 10, 1918.
1,370,434.
Patented Mar. 1, 1921.
2 SHEETS—SHEET 1.
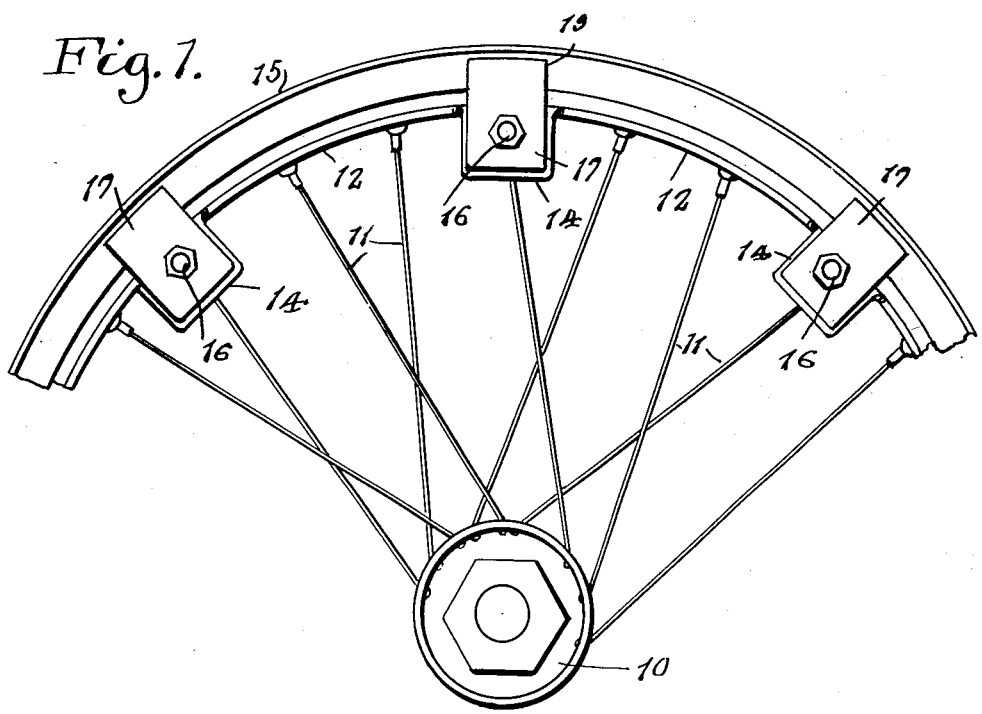
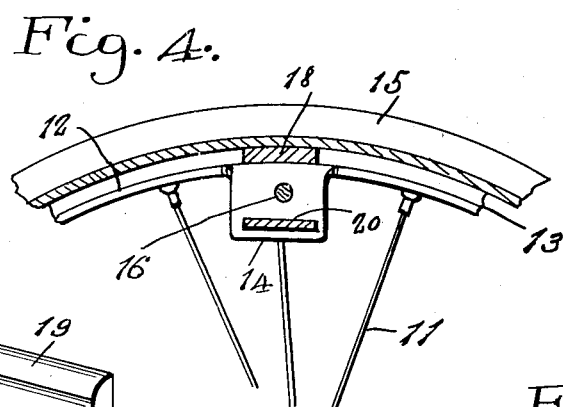
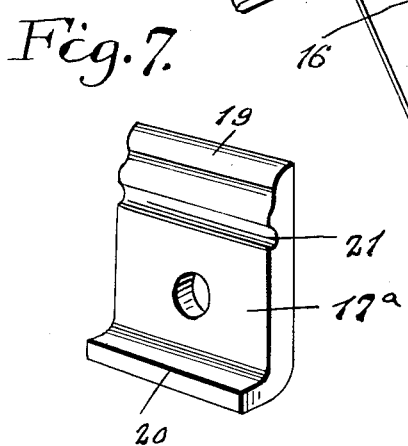
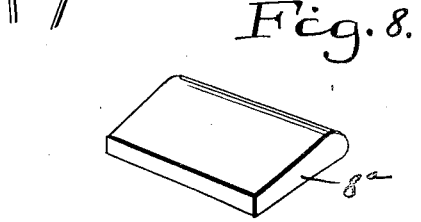
Inventor
A. C. Grant.
By
Attorney A. C. GRANT.
AUTOMOBILE WHEEL.
APPLICATION FILED MAY 10, 1918.
1,370,434.
Patented Mar. 1, 1921.
2 SHEETS—SHEET 2.
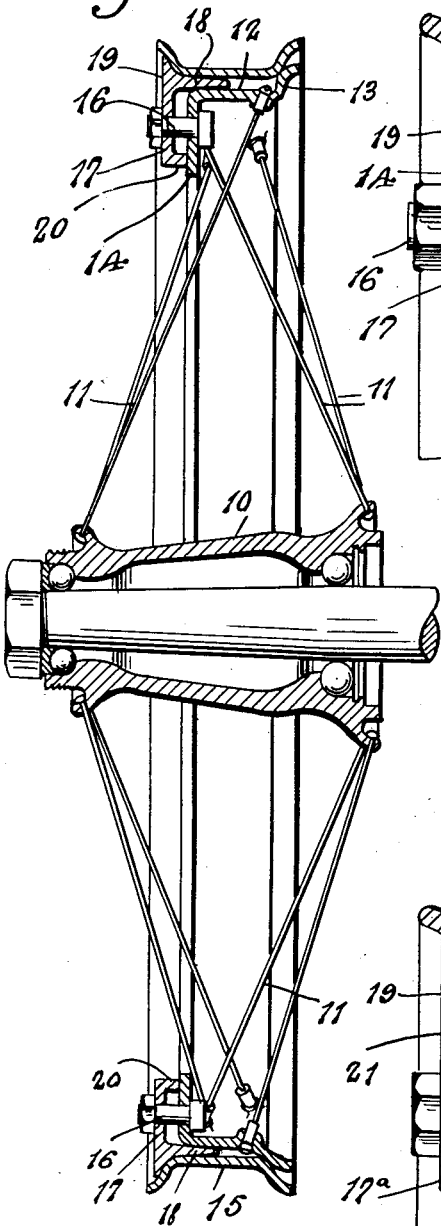
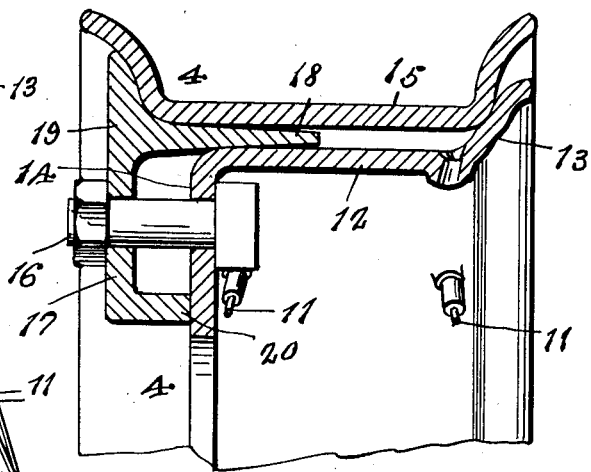
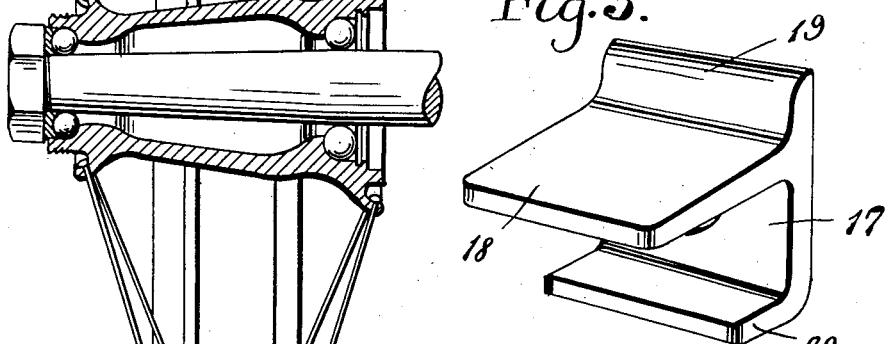
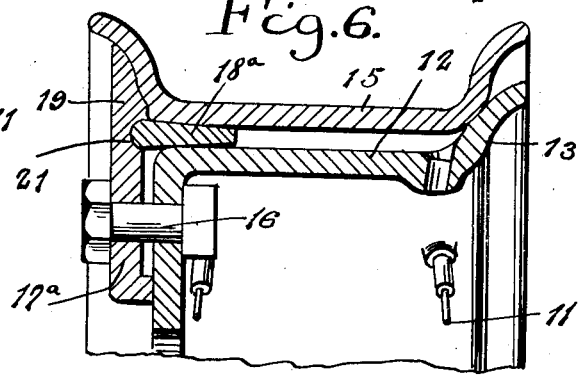

UNITED STATES PATENT OFFICE.

ALBERT C. GRANT, OF CHICAGO, ILLINOIS, ASSIGNOR TO GRANT WIRE WHEEL MANUFACTURING COMPANY, A CORPORATION OF DELAWARE.

AUTOMOBILE-WHEEL.

1,370,434.   Specification of Letters Patent.   Patented Mar. 1, 1921.

Application filed May 10, 1918. Serial No. 233,721.

*To all whom it may concern:*

Be it known that I, ALBERT C. GRANT, a citizen of the United States, residing at Chicago, in the county of Cook and State of Illinois, have invented certain new and useful Improvements in Automobile-Wheels; and I do hereby declare the following to be a full, clear, and exact description of the invention, such as will enable others skilled in the art to which it appertains to make and use the same.

The object of the invention is to provide an auto wheel of the demountable rim type having means for securing the removable rim in place such as to facilitate the application and removal thereof and insure the maintenance of the same in proper relation to the body of the wheel or the main rim under all conditions of normal use involving the protracted and severe vibration to which such devices are subjected; and furthermore to provide demountable rim securing means which may be readily replaced at small cost in the event of their injury.

Further objects and advantages will appear hereinafter, it being understood that changes in form and proportion may be resorted to within the scope of the appended claim without departing from the spirit of the invention.

In the drawings:

Figure 1 is a side view of a wheel having a demountable rim secured in place in accordance with the invention.

Fig. 2 is a sectional view taken axially of the wheel.

Fig. 3 is a detail sectional view enlarged of the rim portion of the wheel.

Fig. 4 is a sectional view taken on a plane indicated by the line 4—4 of Fig. 3.

Fig. 5 is a detail view in perspective of the clamp and wedge shown in Figs. 1 to 3, inclusive.

Fig. 6 is a sectional view showing a slightly modified construction and arrangement of wedge and plate.

Fig. 7 is a detail view in perspective of the clamp plate shown in Fig. 6.

Fig. 8 is a similar view of the wedge shown in Fig. 6.

In the illustrated embodiment of the invention, the main wheel structure is represented by the hub 10 connected by means of spokes 11 with the main rim 12 having a body portion of substantially cylindrical form provided at its inner edge with a flange 13 flared outwardly from the body portion. The cylindrical body portion of the main rim is at its outer edge flared inwardly as shown at 14.

The demountable rim 15 is disposed to embrace or surround the body portion of the main rim and find a seat at its inner edge upon the surface of the outturned flange 13 while secured to the flange 14 by means of a bolt 16 is a clamp 17, of which any desired number may be employed, having a wedge 18 for interposition between the body portions of the demountable and main rims and serving, while properly spacing said rims, to brace the demountable rim and communicate shocks and jars applied to the demountable rim to the body portion of the main rim. At its outer end, each clamp member is flanged or extended as shown at 19 to bear against the surface of the adjacent flange of the demountable rim, while the inner terminal of the clamp plate is provided with a bearing lip 20 to engage the surface of the inturned flange 14 of the main rim.

With the parts constructed and disposed as indicated, the tightening of the bolt 16 forces the wedge between the body portions of the main and demountable rims and the flange or extension 19 serves to crowd the demountable rim toward the seating flange 13 of the main rim and thus locks the elements firmly against vibration or displacement regardless of the vibrations to which the structure may be subjected.

In the modified form illustrated in Fig. 6, the essential difference resides in the fact that the wedge member 18ª is pivotally or rockingly connected with the body portion or plate 17ª of the clamp so that it is free to adapt itself to the interval between the main and demountable rims as a further means of securing said members firmly in their proper relation. The outer end of the movable wedge 18ª is rounded to fit in a correspondingly formed bearing groove 21 in said clamp plate 17ª as will be understood by reference to Figs. 7 and 8.

Having described the invention, I claim:

An automobile wheel including a main rim having an outwardly extended flange at one edge and an inwardly extended flange at the opposite edge, a demountable rim adapted to seat upon said outwardly directed flange, a plurality of clamping bolts extended through said inwardly directed flange, clamping plates mounted on said clamping bolts, each clamping plate having an inwardly turned edge and a transverse groove near its opposite edge and extending across its inner face, and a wedge member for each clamping plate adapted to be driven thereby to position between the main rim and the demountable rim, each wedge member having a rounded edge resting in a transverse groove of the clamping plate with which it is employed, the outer edge of the clamping plate contacting with the adjacent portion of the demountable rim.

In testimony whereof I affix my signature in presence of two witnesses.

ALBERT C. GRANT.

Witnesses:
M. T. WINGFIELD,
I. M. C. HEATH.